United States Patent [19]

Weismann

[11] 4,423,283

[45] Dec. 27, 1983

[54] CONTROLLABLE STIFFNESS DUCT

[76] Inventor: Victor P. Weismann, 430 Prospect Cir., South Pasadena, Calif. 91030

[21] Appl. No.: 277,182

[22] Filed: Jun. 25, 1981

[51] Int. Cl.³ .................. F16L 11/11; F16L 11/12; F16L 11/16

[52] U.S. Cl. .................... 174/47; 138/111; 138/122; 138/131; 138/136

[58] Field of Search ............ 174/47, 70 R, 101.5, 174/109; 138/111, 122, 129, 131, 133, 134, 135, 136, 139, 154; 98/DIG. 7; 156/143, 144, 195; 405/168-171; 15/315; 277/34

[56] References Cited

U.S. PATENT DOCUMENTS

| | | | |
|---|---|---|---|
| 805,825 | 11/1905 | Sussman et al. | 138/136 |
| 1,651,022 | 11/1927 | Fulton | 138/139 X |
| 3,047,026 | 7/1962 | Kahn | 138/122 |
| 3,110,922 | 11/1963 | Senne | 15/315 X |
| 3,117,596 | 1/1964 | Kahn | 138/111 X |
| 3,928,715 | 12/1975 | Holden | 174/47 |
| 4,336,798 | 6/1982 | Beran | 138/111 X |
| 4,368,088 | 1/1983 | Asakura et al. | 138/122 X |

FOREIGN PATENT DOCUMENTS 684276  4/1964  Canada .................. 138/111

Primary Examiner—Laramie E. Askin
Attorney, Agent, or Firm—Christie, Parker & Hale

[57] ABSTRACT

A controllable stiffness duct having a spirally wound metallic strip with a spiral turns interlock to define a flexible product carrying or delivering conduit. Disposed in the spiral turns interlock is a pressure line inflatable to stiffen the conduit and resist collapse. The pressure line may be used to convey fluid through the duct to power a device at a remote end of the duct. The pressure line may include imbedded electrically conductive materials to provide electrical power to the remote end of the duct. An insulating layer and a protective wire rope sheath cover the conduit to form the controllable stiffness duct.

8 Claims, 3 Drawing Figures

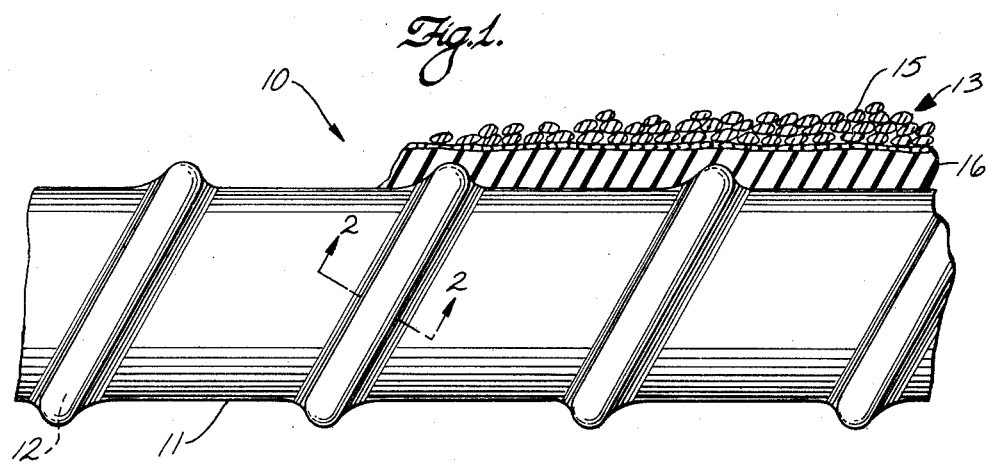
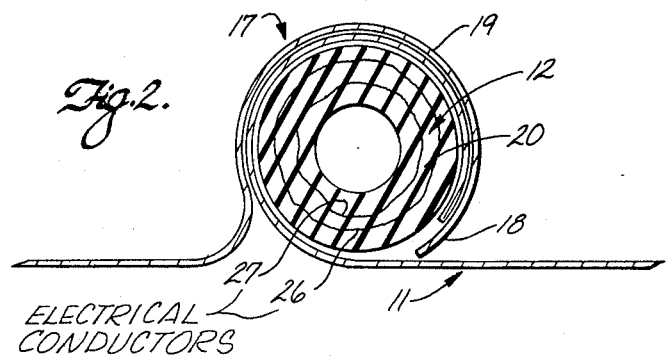
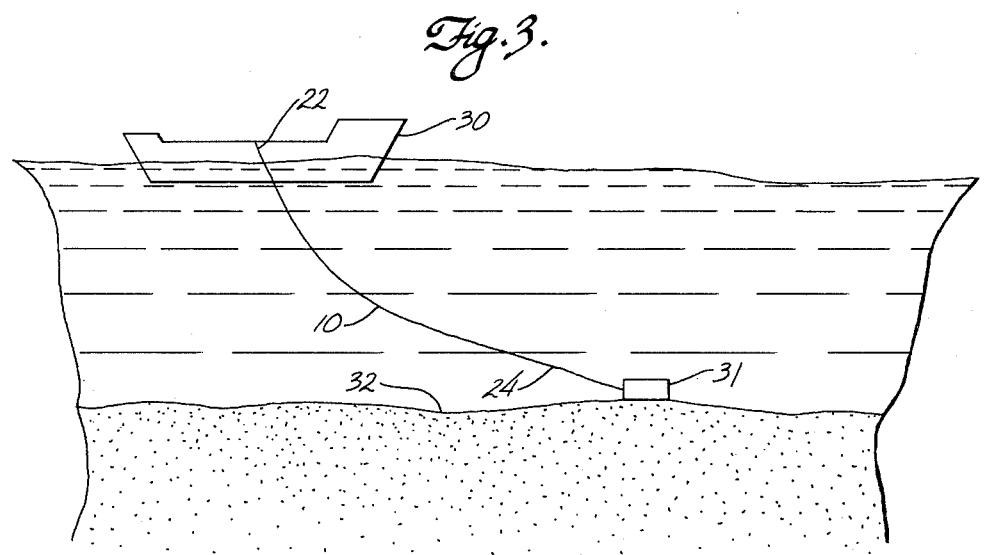

CONTROLLABLE STIFFNESS DUCT

FIELD OF THE INVENTION

This invention relates to flexible ducts. More particularly, it pertains to a flexible duct defined by a spiral wound conduit containing a pressurizable line, the entire assembly being encased in a wire rope sheath.

BACKGROUND OF THE INVENTION

There is current interest in mineral exploration on the ocean floor. It is believed that deposits of valuable minerals, such as nodules rich in manganese and other minerals, are located on the ocean floor at depths of 15,000 feet or greater.

The tremendous hydrostatic pressures at such depths make human activity there impractical. Mineral harvesting requires automated systems.

For efficient operation, it is desirable that automated equipment operate continuously to harvest materials from the sea floor. However, continuous operation requires a continuous supply of power to the harvester mechanism, as well as some means to retrieve the harvested materials back to the ocean surface.

Current vacuum suction ducts are either too rigid or flexible for use in deep water mining. If the duct is too flexible, it is difficult to deploy to the proper location; on the other hand, a rigid duct is subject to failure from cyclic axial and transverse loading which is to be expected on ducts useful in deep water mining.

SUMMARY OF THE INVENTION

This invention provides a duct of controllably variable stiffness which is easy to handle, has high capacity, which can be used either for suction or airlift applications, and which provides both hydraulic and electrical power to its remote end.

The invention provides a duct of flexible material. The duct includes an inflatable stiffener disposed spirally along its length which, upon inflation, stiffens the duct against collapse in response to inwardly acting pressure differences. The entire assembly is encased in a protective sheath having substantial axial load carrying capacity.

In another aspect, the invention comprises a spirally wound metal strip having a continuous interlock configuration between adjacent turns of the spiral for defining a flexible duct. An inflatable seal disposed in the interlock configuration resists collapse of the duct and reduces motion in the interlock configuration to stiffen the duct when inflated. Preferably the inflatable seal comprises a pressure duct capable of conducting a fluid from one end of the flexible duct to the other end for supplying fluid power to the remote end. In its presently preferred embodiment, the entire assembly is encased in a sheath of wire rope for increasing the axial load handling capacity of the flexible duct.

BRIEF DESCRIPTIONS OF THE DRAWINGS

The above mentioned and other features of this invention are more fully set forth in the following detailed description of the presently preferred embodiment, which description is presented with reference to the accompanying drawings, wherein:

FIG. 1 is an elevation view, partially in section, of a controllable stiffness conduit, according to this invention;

FIG. 2 is a sectional view taken along lines 2—2 of FIG. 1, of an inflatable pressure duct disposed within an interlock useful with the conduit; and FIG. 3 is a schematic illustrating the controllable stiffness duct in use between an ocean surface vessel and a harvester on the sea floor.

DETAILED DESCRIPTION

As shown in FIGS. 1 and 2, a controllable stiffness duct 10 comprises an inner fluid flow conduit 11, a pressure line 12, and an enclosing sheath 13. The sheath is preferably a wire rope cable having wire strands 15 interwoven in opposite spiral directions around the exterior of the conduit. A layer of flexible insulating material 16, preferably rubber or the like, is interposed between the sheath wires and the conduit about the circumference and length of the conduit.

The conduit comprises the main body of the controllable stiffness duct. The conduit is preferably a hollow and flexible elongate metallic tubular construction which is capable of transmitting useful pressure or suction from one of its ends to the other. The pressure line 12 is spirally disposed within the walls of the conduit.

In the illustrated presently preferred embodiment, the conduit is manufactured by forming an elongate strip of metal via the agency of dies over a tube mandrel. The metal strip is wrapped in a spiral manner to form the tubular conduit. Adjacent margins 18 and 19 of adjacent turns of the metal strip define a turns interlock construction 17, which is shown in cross section in FIG. 2. The turns interlock construction as formed is such that the adjacent cooperatively formed margins of the metal strip can move relative to each other a desired small amount, thereby enabling the conduit as formed to be bent and coiled. The interlock construction itself, as formed from the metal strip, imparts to the conduit some resistance to collapse of the conduit under external pressures greater than the pressure in the fluid flow passage defined along the interior of the duct.

The conduit per se, as formed from spirally wound metal strips, resembles BX armored conduit which is widely used for protecting electrical wiring in various situations.

As the metal strip is spirally wound and marginally formed to define conduit 11 according to the preceding description, the strip margins are bent around an elongate, hollow, continuous inflatable seal mamber 12 which also serves as a pressure line in duct 10. That is, as formed, conduit 11 defines a passage which extends spirally around and along the conduit, and seal member 12 is disposed in this passage and extends continuously from end to end of the conduit. Seal member 12 preferably is provided in the form of a hydraulic pressure hose which preferably expands a small amount when fluid in the hose is at or above a selected pressure. The outer diameter of the hose when not pressurized is a selected small amount less than the inner diameter of the spiral passage in which it is located as defined by the turns interlock construction and configuration of conduit 11 as formed. Thus, the simple unpressurized presence of the hose in the interlock construction passage does not detract from the flexibility of conduit 11.

However, when the interior of seal member 12 is filled with fluid under pressure, several beneficial effects are produced, all of which work together to provide desirable results and benefits in duct 10. Initial pressurization of the seal member interior causes the seal member to expand radially and to tend to become straight. At a desired relatively low internal pressure, the seal member expands sufficiently to entirely fill the spiral passage in which it is disposed and to drive the adjacent formed margins 18 and 19 of the spirally wound metal strip into intimate face to face contact throughout the region in which the strip margins overlie each other in the interlock construction. Such face to face contact of the strip margins renders the conduit leakproof. Such face to face contact of the strip margins also reduces the ability of the margins to move relative to each other in the interlock construction, thus reducing the flexibility of the conduit. The reduction in conduit flexibility increases with increasing fluid pressure within the seal member. Thus, regulation of the pressure within the seal member enables control over the flexibility of the conduit.

Further, the tendency of the seal member to straighten when pressurized causes the seal member to apply force to the inside of the interlock construction in a direction radially outward from the conduit central passage. This force acts opposite to forces acting inwardly on the conduit causing the conduit to tend to collapse; collapse inducing forces would be created by a pressure outside the conduit greater than the pressure inside the conduit. Thus, pressurization of the seal member strengthens the conduit against loads inducing its collapse.

As noted above, seal member 12 is in reality a fluid pressure line within the walls of conduit 11. The pressure linee preferably is defined principally of rubber 20 or the like with suitable layers 26 and 27 of reinforcing material within the base material defining the walls of the line. Still more preferably, reinforcing layers 26 and 27 are made of copper mesh which are insulated from each other within the line walls, thereby providing two electrical conductors which extend the length of the conduit within the spiral passage defined in the wall of the conduit. The seal member in addition to its other functions thus provides a means conducting fluid power and electrical power from one end 22 of the conduit to the other end 24 (See FIG. 3).

Conduit 11, even with seal member 12 incorporated therein, because of its basically spiral construction, is not well suited to carry substantial axial loads. Sheath 13, however, is provided to impart substantial axial load carrying capacity to the overall duct 10. The resilient and flexible layer 16 between the principal sheath elements 15 and the conduit protects them from abrasion during flexing of the duct.

The provision of conductors enables electrical power to be supplied from, for example, a shipboard end 22 of the controllable stiffness conduit, to a remote end 24 of the duct, which in FIG. 3 is shown disposed on the ocean floor.

In effect the invention provides a wire rope cable having a core of a flexible metallic conduit which contains a spirally wound hydraulic pressure line to stiffen the conduit against collapse and flexing as well as providing hydraulic and electrical power to the remote end of the conduit.

The spiral winding of pressure line 12 around the tubular conduit provides several advantages. Upon pressurization, reactive forces act both radially and along the longitudinal axis of conduit 11 to keep the tube from collapsing from internal pressure and from leaking. Pressurization also stiffens the conduit along its longitudinal axis which makes the assembly easier to handle and to direct. The pressure line also provides a means for providing useful electrical and hydraulic power to the remote end of the flexible stiffness conduit, without requiring internal structure in the conduit which would otherwise interfere with its useful functions. This is particularly advantageous for use in mining minerals, such as nodules of magnesium, from the ocean floor, where direct human access to the remote end of the controllable stiffness duct is impractical.

The structure of the controllable stiffness duct lends to ready manufacture. The metallic conduit 11 is formed with the agency of appropriate dies and a tube mandrel, the hydraulic pressure line 12 being fed concurrently into place and locked in by the forming of the metal in the turns interlock structure 18,19.

After the conduit is completed, the outside of the assembly is coated with flexible material 16, such as rubber or plastic. Finally, a sheath 13 of wire rope 15 is loomed over the entire structure to complete the controllable stiffness duct.

The sheath enhances the circumferential strength of the controllable stiffness duct which guards against collapse or failure of the duct in use in deep ocean areas. The wire sheathing has a degree of flexibility which allows the entire structure to bend as necessary, to accommodate relative transverse loading expected in a deployed structure which may have a length upwards of 35,000 feet disposed in 15,000 or more feet of water, such as is shown in FIG. 3, where such a controllable stiffness duct 10 is shown in use connecting a ship 30 with a harvester mechanism 31 on the ocean floor 32. The layer of insulating material 16 acts to equalize or distribute loads on the product conduit.

While the wire sheathing absorbs axial loading and protects the flexible conduit 11, the conduit harbors and protects the hydraulic and electrical lines which are contained in the turns interlock structure along with pressure line 12, which, by selective control of its pressurization, provides a means to control the stiffness of the overall assembly. The flexible pressure line also acts as a seal between adjacent metal parts of the conduit 11.

Connections at each end of the controllable stiffness duct are conventional and are designed to transfer loading and connect both the hydraulic and electrical power available.

It is contemplated that the controllable stiffness duct may be used in seawater in an estimated depth of 15,000 feet. For these applications, the hydraulic system must be capable of operating in the range of 12,000 to 15,000 pounds per square inch so that hydraulic power will be available at the remote end 24 of the duct for operating the harvester mechanism 31. This means that the pressure line must be capable of operating in such a pressure range. Preferably the pressure fluid is released to the ocean after being put to useful work by the harvester mechanism as it is not reasonably practical to have a return line to the surface. The pressure fluid in such an application is preferably seawater which can be economically discharged after use at the bottom.

If desired, the pressure fluid can comprise a gas so that an airlift effect can be used in the product conduit. For this application, it is necessary that the harvester mechanism meter incoming pressurized air from line 12 to conduit 11 so that materials harvested from the ocean floor 32 will be properly airlifted to the surface over the long (approximately 30,000 to 40,000 ft.) length of the controllable stiffness duct.

Alternately, a suction pump on surface vessel 30 connected to the conduit can be used for transport of materials through the conduit to the ocean surface. In this case, harvester mechanism 31 comprises a vacuum head operated by hydraulic power provided through pressure line 12, and electrical power through insulated conductors 26, 27.

The pattern of looming of wire rope sheath 13 may be largely circumferential or largely axial with respect to the duct, depending on whether internal pressure in the conduit is low relative to external pressure on the duct. If internal pressure is relatively low, as in an airlift application, preferably the sheath is loomed primarily axially relative to the duct. On the other hand, where pressure differentials are not great, as in a suction application, the sheath preferably is loomed primarily circumferentially.

As a vacuum suction duct, the invention functions as a flexible duct having a spiral inflatable stiffener which is encased in a protective sheath which substantially increases the axial load capacity of the duct.

When the pressure line is not under pressure, the duct is sufficiently flexible to permit storage on a reel. To deploy the duct from an ocean surface vessel, the duct remote end is connected to a vacuum harvester 31, and the duct is reeled out to the length desired. The axial load on the duct by the harvester is carried by the duct sheath predominantly. The pressure line 12 is connected and pressurized, and the electrical conductors are energized. A suction pump is connected to the conduit, and the duct is ready for use.

When it is time to move operations, the suction, electrical and pressure lines are disconnected and the duct reeled in.

The foregoing description of a fluid flow duct of controllably variable stiffness has been presented in the context of, and via the vehicle of the presently preferred form and mode of practicing the invention. The duct may be used in many diverse applications. Therefore, workers skilled in the art to which this invention pertains, will appreciate that the foregoing description is largely illustrative, that other structural and procedural embodiments of the invention may be practiced within the fair scope of such description, and that the following claims are to be interpreted consistent with the fair scope of this invention which admits of reasonable departures from the foregoing description.

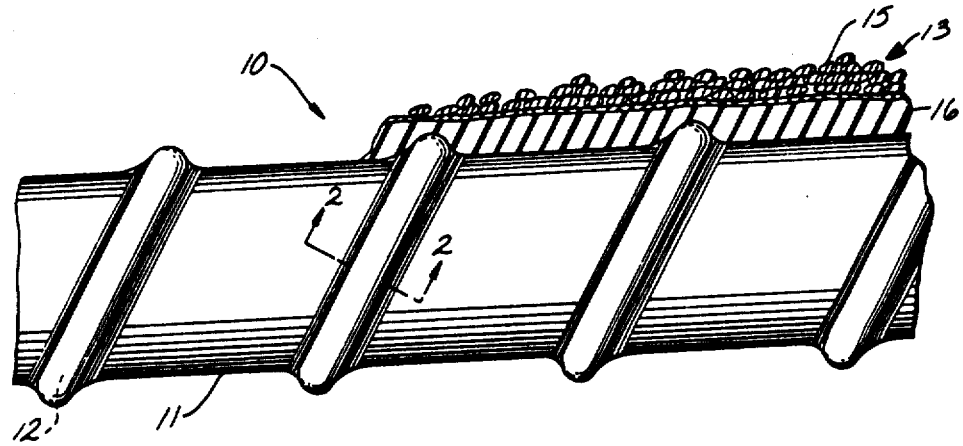

What is claimed is:

1. A spiral wound strip having a turns interlock continuously along the spiral for defining a flexible duct, and an inflatable seal disposed in the interlock, said seal when inflated stiffening the duct.

2. Apparatus according to claim 1 wherein the inflatable seal comprises a pressure line capable of conducting a fluid from one end of the flexible duct to the other end, for supplying fluid power to the other duct end.

3. Apparatus according to claim 2 wherein the pressure line includes imbedded conductors for supplying electrical power from one end of the flexible duct to the other end.

4. Apparatus according to claim 2 wherein said pressure line is adapted to conduct a compressed gas from one end of the flexible duct to the other end submerged in a liquid, said pressure line delivering said gas to said other end to define an air lift to move materials from said submerged other end to said one end.

5. A controllable stiffness flexible duct assembly comprising a central conduit and an enclosing sheath disposed along and circumferentially about the exterior of the conduit, the conduit being comprised of a strip of metal disposed in a spiral of uniform pitch and diameter, the strip having adjacent margins thereof cooperatively interrelated and engaged to afford inherent limited relative motion between them thereby to define a flexible conduit and to define a tubular passage spirally around and along the conduit, and a hollow expansible tubular seal member disposed in and extending along the extent of the passage, the sheath comprising a plurality of wire strands disposed about the exterior of the conduit in opposite directions spirally about the conduit.

6. A duct according to claim 5 including a plurality of electrical conductors disposed in the passage and extending therealong.

7. A duct according to claim 6 wherein the conductors are components of the seal member.

8. A duct according to claim 5 wherein the sheath includes a flexible and resilient material between the conduit and the wire strands.

* * * * *

UNITED STATES PATENT AND TRADEMARK OFFICE
CERTIFICATE OF CORRECTION

PATENT NO. : 4,423,283　　　　　　　　　　　Page 1 of 2

DATED : December 27, 1983

INVENTOR(S) : Victor P. Weismann

It is certified that error appears in the above-identified patent and that said Letters Patent is hereby corrected as shown below:

The title page, should appear as per attached title page.

Signed and Sealed this

*Fourteenth* Day of *August 1984*

[SEAL]

*Attest:*

GERALD J. MOSSINGHOFF

*Attesting Officer*　　　*Commissioner of Patents and Trademarks*

United States Patent [19]
Weismann

[11] 4,423,283
[45] Dec. 27, 1983

[54] CONTROLLABLE STIFFNESS DUCT

[76] Inventor: Victor P. Weismann, 430 Prospect Cir., South Pasadena, Calif. 91030

[21] Appl. No.: 277,182

[22] Filed: Jun. 25, 1981

[51] Int. Cl.³ .................. F16L 11/11; F16L 11/12; F16L 11/16
[52] U.S. Cl. .................. 174/47; 138/111; 138/122; 138/131; 138/136
[58] Field of Search .................. 174/47, 70 R, 101.5, 174/109; 138/111, 122, 129, 131, 133, 134, 135, 136, 139, 154; 98/DIG. 7; 156/143, 144, 195; 405/168-171; 15/315; 277/34

[56] References Cited

U.S. PATENT DOCUMENTS

| | | | |
|---|---|---|---|
| 805,825 | 11/1905 | Sussman et al. | 138/136 |
| 1,651,022 | 11/1927 | Fulton | 138/139 X |
| 3,047,026 | 7/1962 | Kahn | 138/122 |
| 3,110,922 | 11/1963 | Senne | 15/315 X |
| 3,117,596 | 1/1964 | Kahn | 138/111 X |
| 3,928,715 | 12/1975 | Holden | 174/47 |
| 4,336,798 | 6/1982 | Beran | 138/111 X |
| 4,368,088 | 1/1983 | Asakura et al. | 138/122 X |

FOREIGN PATENT DOCUMENTS 684276  4/1964  Canada .................. 138/111

*Primary Examiner*—Laramie E. Askin
*Attorney, Agent, or Firm*—Christie, Parker & Hale

[57] ABSTRACT

A controllable stiffness duct having a spirally wound metallic strip with a spiral turns interlock to define a flexible product carrying or delivering conduit. Disposed in the spiral turns interlock is a pressure line inflatable to stiffen the conduit and resist collapse. The pressure line may be used to convey fluid through the duct to power a device at a remote end of the duct. The pressure line may include imbedded electrically conductive materials to provide electrical power to the remote end of the duct. An insulating layer and a protective wire rope sheath cover the conduit to form the controllable stiffness duct.

8 Claims, 3 Drawing Figures